(12) United States Patent
Sherwood et al.

(10) Patent No.: US 9,114,568 B2
(45) Date of Patent: *Aug. 25, 2015

(54) EXTRUSION OF ADHESIVES FOR COMPOSITE STRUCTURES

(75) Inventors: Travis J. Sherwood, Seattle, WA (US);
Brian G. Robins, Renton, WA (US);
Darrell D. Jones, Mill Creek, WA (US);
Joseph D. Brennan, Poway, CA (US);
Michael R. Anderson, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 509 days.

This patent is subject to a terminal disclaimer.

(21) Appl. No.: 13/524,792

(22) Filed: Jun. 15, 2012

(65) Prior Publication Data

US 2012/0261059 A1 Oct. 18, 2012

Related U.S. Application Data

(62) Division of application No. 12/331,389, filed on Dec. 9, 2008, now Pat. No. 8,216,499.

(51) Int. Cl.
*D01D 5/16* (2006.01)
*B29C 47/88* (2006.01)
(Continued)

(52) U.S. Cl.
CPC ....... *B29C 66/43441* (2013.01); *B05C 17/0103* (2013.01); *B29C 47/0016* (2013.01); *B29C 47/54* (2013.01); *B29C 47/92* (2013.01); *B29C 65/524* (2013.01); *B29C 65/7841* (2013.01); *B29C 66/112* (2013.01); *B29C 66/131* (2013.01); *B29C 66/474* (2013.01); *B29C 66/721* (2013.01); *B29C 66/843* (2013.01); *B29D 99/0014* (2013.01); *B64C 1/064* (2013.01); *B64C 1/12* (2013.01); *B64F 5/0009* (2013.01); *B05C 17/002* (2013.01); *B05C 17/0052* (2013.01); *B05C 17/00513* (2013.01); *B05C 17/00516* (2013.01); *B05C 17/00523* (2013.01); *B29C 35/02* (2013.01); *B29C 47/82* (2013.01); *B29C 65/483* (2013.01); *B29C 65/525* (2013.01); *B29C 2947/922* (2013.01); *B29C 2947/9258* (2013.01); *B29C 2947/92076* (2013.01); *B29C 2947/92095* (2013.01); *B29C 2947/92142* (2013.01); *B29C 2947/92161* (2013.01); *B29C 2947/92409* (2013.01); *B29C 2947/92695* (2013.01); *B29C 2947/92704* (2013.01); *B29C 2947/92952* (2013.01); *B29K 2105/06* (2013.01); *B29L 2031/3082* (2013.01); *B29L 2031/766* (2013.01); *B64C 2001/0072* (2013.01); *Y02T 50/433* (2013.01)

(58) Field of Classification Search
None
See application file for complete search history.

(56) References Cited

U.S. PATENT DOCUMENTS 3,020,907 A 2/1962 Lease, Sr.
3,993,726 A * 11/1976 Moyer .................... 264/171.12
(Continued)

OTHER PUBLICATIONS

USPTO Office Action, dated May 13, 2010, regarding U.S. Appl. No. 12/331,389, 11 pages.

(Continued)

*Primary Examiner* — Jeffrey Wollschlager
(74) *Attorney, Agent, or Firm* — Yee & Associates, P.C.

(57) ABSTRACT

A structural filler is installed in a gap between at least first and second composite members by extruding a flowable filler material, placing the extruded filler on one of the composite structural members, and assembling the composite members.

1 Claim, 9 Drawing Sheets (51) Int. Cl.

| | |
|---|---|
| *B29C 45/14* | (2006.01) |
| *B29C 65/00* | (2006.01) |
| *B05C 17/01* | (2006.01) |
| *B29C 47/00* | (2006.01) |
| *B29C 47/54* | (2006.01) |
| *B29C 65/78* | (2006.01) |
| *B29D 99/00* | (2010.01) |
| *B64C 1/06* | (2006.01) |
| *B64C 1/12* | (2006.01) |
| *B64F 5/00* | (2006.01) |
| *B29C 65/52* | (2006.01) |
| *B29C 47/92* | (2006.01) |
| *B05C 17/00* | (2006.01) |
| *B05C 17/005* | (2006.01) |
| *B29C 35/02* | (2006.01) |
| *B29C 47/82* | (2006.01) |
| *B29K 105/06* | (2006.01) |
| *B29L 31/30* | (2006.01) |
| *B29L 31/00* | (2006.01) |
| *B64C 1/00* | (2006.01) |
| *B29C 65/48* | (2006.01) |

(56) References Cited

U.S. PATENT DOCUMENTS

| | | | |
|---|---|---|---|
| 4,151,031 A * | 4/1979 | Goad et al. .................... 156/201 |
| 4,604,319 A | 8/1986 | Evans et al. | |
| 4,653,675 A | 3/1987 | Ratzky | |
| 4,789,594 A | 12/1988 | Stawski | |
| 4,974,752 A | 12/1990 | Sirek | |
| 4,980,005 A * | 12/1990 | Scollard .......................... 156/92 |
| 5,358,397 A | 10/1994 | Ligon et al. | |
| 5,833,786 A | 11/1998 | McCarville et al. | |
| 6,231,941 B1 | 5/2001 | Cundiff et al. | |
| 6,428,873 B1 * | 8/2002 | Kerr ................................ 428/95 |
| 6,562,436 B2 | 5/2003 | George et al. | |
| 6,689,448 B2 | 2/2004 | George et al. | |
| 6,709,538 B2 | 3/2004 | George et al. | |
| 6,729,676 B1 * | 5/2004 | O'Hara et al. ............. 296/146.5 |
| 6,852,268 B1 | 2/2005 | Valyi et al. | |
| 6,964,723 B2 | 11/2005 | Lindsay et al. | |
| 7,312,274 B2 | 12/2007 | Millard et al. | |
| 7,670,527 B2 | 3/2010 | Malis | |
| 7,758,715 B2 | 7/2010 | Petersson et al. | |
| 7,803,459 B2 | 9/2010 | Keuchel et al. | |
| 8,216,499 B2 | 7/2012 | Sherwood et al. | |
| 2003/0168889 A1 * | 9/2003 | Comert et al. ................ 296/210 |
| 2004/0151865 A1 * | 8/2004 | Howland ......................... 428/58 |
| 2004/0209093 A1 | 10/2004 | Keuchel et al. | |
| 2005/0077683 A1 * | 4/2005 | Comert et al. ................ 277/300 |
| 2005/0112321 A1 | 5/2005 | Millard et al. | |
| 2007/0196637 A1 * | 8/2007 | Good et al. ................. 428/297.4 |
| 2007/0261787 A1 | 11/2007 | Malis | |
| 2009/0110836 A1 | 4/2009 | Petersson et al. | |
| 2010/0140834 A1 | 6/2010 | Sherwood et al. | |
| 2011/0220006 A1 * | 9/2011 | Kaye et al. .................... 116/201 |

OTHER PUBLICATIONS

Response to Office Action, dated Sep. 10, 2010, regarding U.S. Appl. No. 12/331,389, 25 pages.

USPTO Final Office Action, dated Nov. 15, 2010, regarding U.S. Appl. No. 12/331,389, 20 pages.

Response to Final Office Action, dated Feb. 15, 2010, regarding U.S. Appl. No. 12/331,389, 20 pages.

USPTO Office Action, dated May 4, 2011, regarding U.S. Appl. No. 12/331,389, 8 pages.

Response to Office Action, dated Aug. 12, 2011, regarding U.S. Appl. No. 12/331,389, 23 pages.

USPTO Final Office Action, dated Oct. 20, 2010, regarding U.S. Appl. No. 12/331,389, 11 pages.

Response to Office Action, dated Feb. 10, 2012, regarding U.S. Appl. No. 12/331,389, 8 pages.

USPTO Notice of Allowance, dated Mar. 5, 2012, regarding U.S. Appl. No. 12/331,389, 7 pages.

* cited by examiner

EXTRUSION OF ADHESIVES FOR COMPOSITE STRUCTURES

This application is a divisional application of U.S. application Ser. No. 12/331,389, filed Dec. 9, 2008, status pending.

TECHNICAL FIELD

This disclosure generally relates to methods and equipment for producing composite structures, and deals more particularly with the extrusion of structural adhesives used as fillers between composite parts.

BACKGROUND

When composite structural members are joined together, gaps or voids may be present along bond lines between the members which may need to be filled in order to increase the strength of the bond. For example, in the aircraft industry, composite fuselage stiffeners such as stringers may include adhesive filler at the radius bond line between the stringer and a fuselage skin. Voids may also be present where plies are bent or folded during layup. The adhesive filler is applied in the form of triangular cross section strips, sometimes referred to as noodles or fillers, which fill the voids at the bond line. The fillers may be fabricated from laminated strips of adhesive that are precision cut and roll formed in a sequential manner. This fabrication process requires inspection for foreign object debris, as well as hand installation of the filler into the stringer. Thus, the current process is labor intensive, may require close quality control and necessitates the prefabrication of the fillers prior to installation. Because the fillers must be prefabricated, they may be required to be stored in a chilled environment, typically in a freezer, so that their shape is maintained. Moreover, because of the precision cuts and sequential forming process, the current process may be difficult to automate.

Accordingly, there is a need for a method of forming adhesive fillers that may reduce labor costs, processing time and the need to prefabricate the fillers in advance of their installation.

SUMMARY

According to the disclosed embodiments, a method and apparatus are provided for fabricating fillers that reduce processing time and labor costs by extruding the fillers. The fillers may be extruded either directly onto a composite structural member in order to fill a void in a composite structure, or onto a tool that may be used to maintain the cross-sectional shape of the filler and place the shaped filler on a structural member. The disclosed method may substantially eliminate the need for prefabricating and storing fillers.

According to one disclosed embodiment, a method is provided for installing a structural filler in a gap between at least first and second composite members. A filler is formed by extruding a flowable filler material and placing the filler on the first composite structural member. The first and second structural members can then be assembled with the filler positioned within a gap between the composite members. The filler may be placed on the first composite member by extruding a flowable filler material directly onto the first composite structural member, or by extruding the filler onto a tool which is then used to place the filler on the structural member. The method may also include controlling the viscosity of the filler material as it is dispensed by heating the filler material to change its viscosity.

According to another method embodiment, a structural filler for composite structures is formed by forming a length of an uncured filler by extruding a flowable filler material. The rate at which the flowable filler material is extruded may be controlled. The viscosity of the flowable filler material may also be controlled. The extruded length of the filler material is cured and then formed by relatively moving a dispensing gun and a substrate, and extruding the flowable filler material through a nozzle onto the substrate. In one embodiment, the substrate may comprise a structural member, while in another embodiment, the substrate may comprise a tool used to place the filler onto a structural member.

According to another embodiment, apparatus is provided for producing a structural filler for a gap in a composite structure. The apparatus includes means for extruding a filler onto a tool. The tool may be used for transferring the filler onto a composite structure. The dispensing means may include a body adapted to hold flowable filler material and a nozzle through which the flowable filler material may be extruded. The dispensing means may also include means for forcing the flowable filler material to flow from the body through the nozzle. Means may be provided for controlling the viscosity of the flowable filler material.

The disclosed embodiments satisfy the need for a method and apparatus for extruding adhesive fillers which reduces processing time, labor costs and may obviate the need for prefabrication and storage of fillers.

BRIEF DESCRIPTION OF THE ILLUSTRATIONS

DETAILED DESCRIPTION

Figure 1:
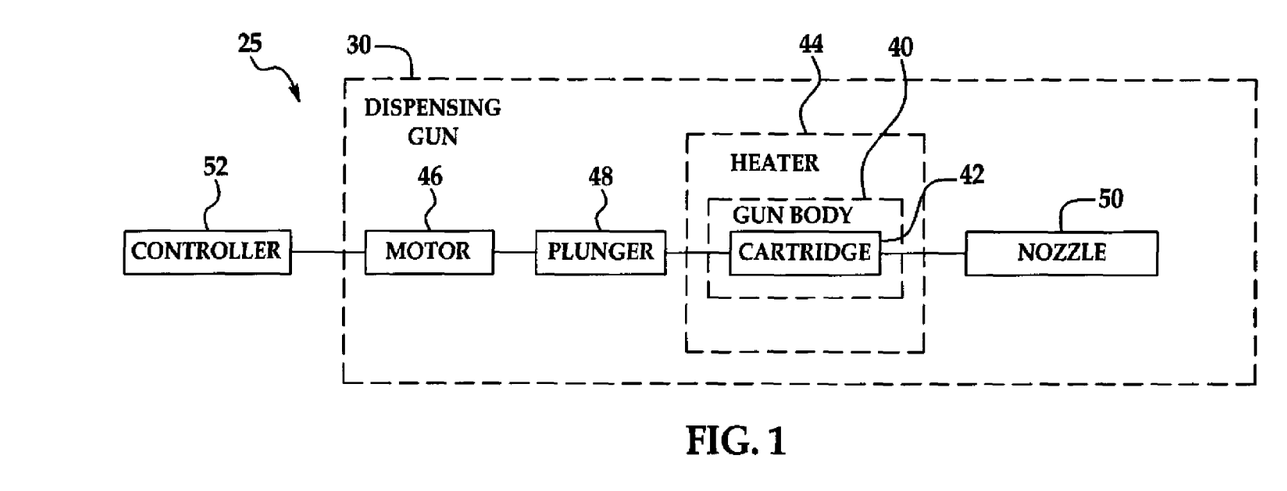
FIG. 1 is a functional block diagram of apparatus for extruding an adhesive filler.
Figure 2:
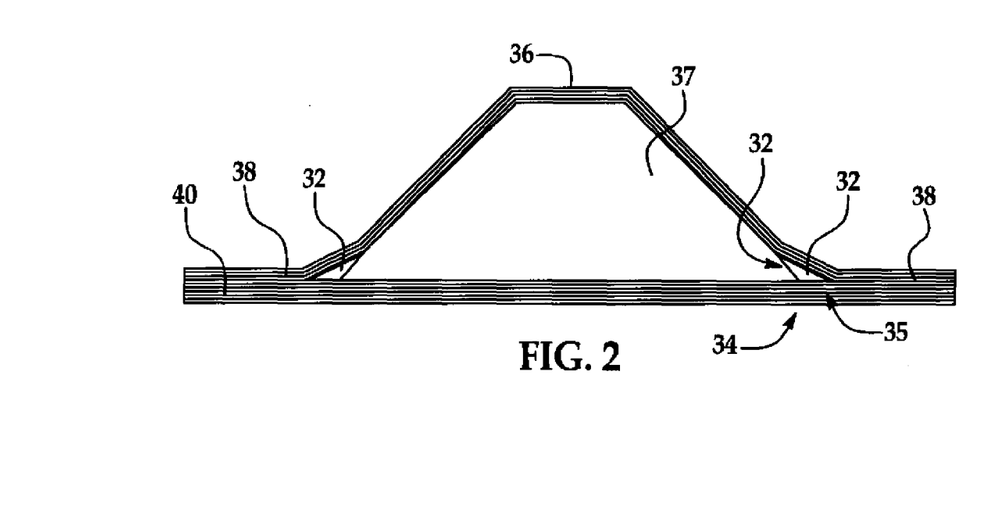
FIG. 2 is a sectional view illustrating a hat-shaped stringer on a fuselage skin, and showing an adhesive filler used to fill a void along a radius bond line between the stringer and the skin.

Referring first to FIGS. 1 and 2, the disclosed embodiments relate to apparatus generally indicated by the numeral 25 that may be used to form and place an adhesive filler 32 in a gap or void 34 along a bond line 35 between two composite structural members 36, 40. In the illustrated embodiment, structural member 36 comprises a hat-shaped stringer and structural member 40 comprises a fuselage skin (FIG. 2) of an aircraft (not shown). The stringer 36 functions to reinforce and stiffen the fuselage skin 40. The stringer 36 includes flanges 38 that are bonded or co-cured with the skin 40. A small gap 34 may be formed along the length of the stringer 36 between the skin 40 and a radius corner (not shown) extending along the bond line 35. The filler 32, sometimes also referred to as a "noodle", fills the gap 34 along the bond line 35 in order to improve the strength of the bond between the stringer 36 and the skin 40. A bladder 37 may act as a mandrel to apply pressure to the stringer 36 during consolidation and/or bonding or cocuring of the stringer 36 and the skin 40.

Referring particularly to FIG. 1, the apparatus 25 broadly includes a dispensing gun 30 operated by a controller 52 which may comprise, for example and without limitation, a computer or a PLC (programmable logic controller). The dispensing gun 30 broadly includes a rigid body 40 (gun body) that holds a cartridge 42 containing a flowable adhesive material 45 (FIG. 3), such as a commercially available structural adhesive. A heater 44 on the body 40 may be provided to heat the adhesive material 45 in the cartridge 42 in order to control the viscosity of the adhesive material 45, and thus its flow characteristics. A motor 46 drives a plunger 48 that forces adhesive material 45 in the cartridge 42 to be extruded through a nozzle 50 at a rate determined by the controller 52.

Figure 3:
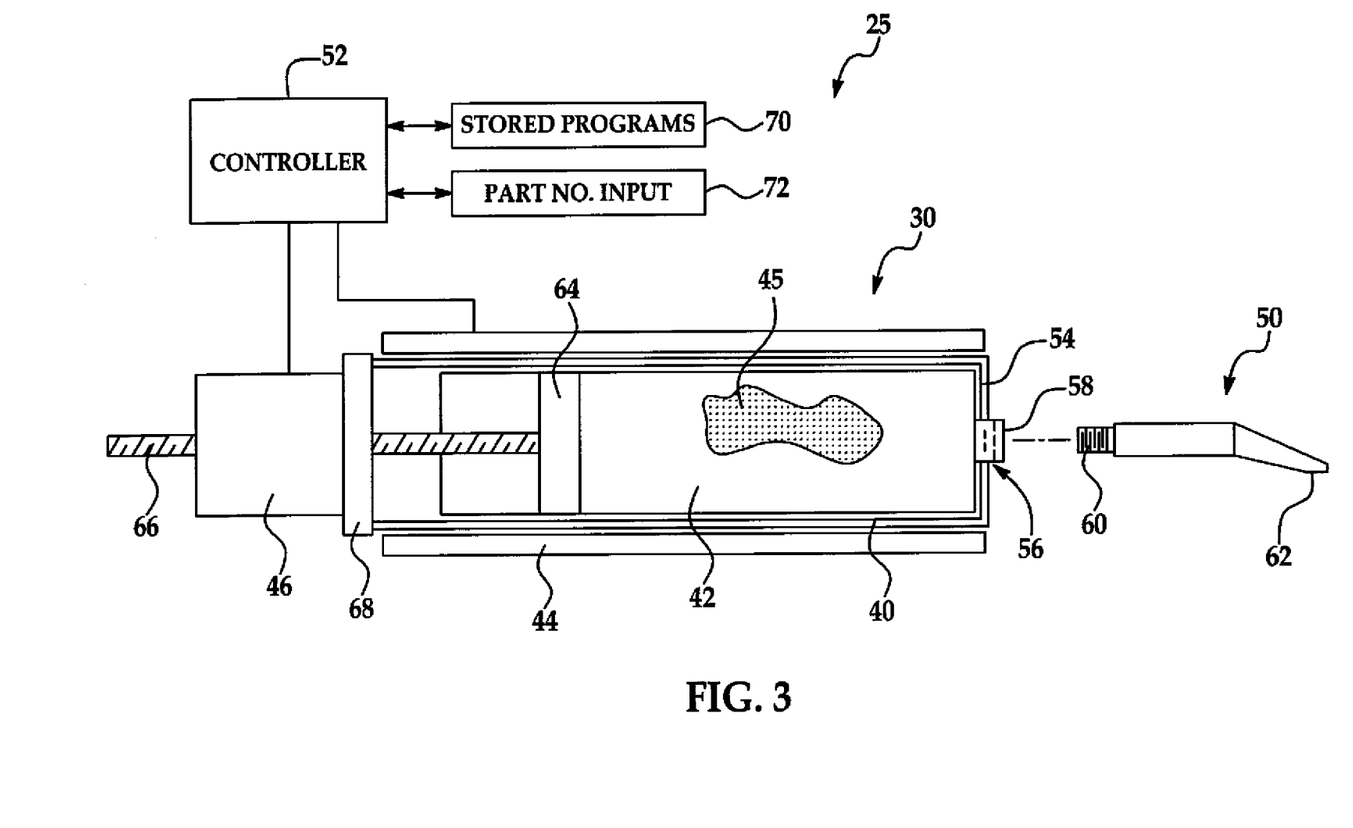
FIG. 3 is a combined block and diagrammatic view of apparatus for extruding an adhesive filler.

Additional details of the apparatus 25 are illustrated in FIG. 3. The body 40 is generally cylindrical in shape and includes an end wall 54 having an opening 56 therein. A cartridge 42 filled with a suitable structural adhesive material 45 is housed within the body 40 and includes a threaded outlet 58 passing through the opening 56 in the wall 54. The threaded outlet 58 is adapted to receive the threaded end 60 of a nozzle 50 having a nozzle opening 62 through which the adhesive material 45 may be extruded. A cap 68 on one end of the body 40 may be removed to allow replacement of the cartridge 42.

The body 40 may be formed of a thermally conductive material such as, without limitation, metal and may be surrounded by an electrically powered heating blanket 44 which may be used to heat the adhesive material 45 and thereby control the viscosity of the adhesive material 45, and thus its flow characteristics. The temperature of the heating blanket 44 may be controlled by a controller 52. While a heating blanket 44 has been illustrated in the disclosed embodiments, a variety of other techniques and devices may be employed to heat the adhesive material 45. A motor 46 operated by controller 52 is connected through a screwdrive 66 to the plunger 64. Operation of the motor 46 controls displacement of the plunger 64 which applies pressure to the adhesive material 45 within the cartridge 42, forcing the latter to be extruded through the nozzle 50 at a rate determined by the speed of the motor 46 and the controller 52.

The rate at which the adhesive material 45 is extruded through the nozzle 50 may be determined by stored programs 70 used to operate the controller 52. For example, an operator may input a part number at 72 which results in the selection of a particular stored program 70 that determines the rate of extrusion for a particular part.

Figure 4:
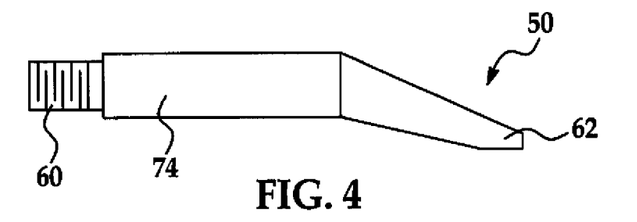
FIG. 4 is a side view of a nozzle forming part of the apparatus shown in FIG. 3.
Figure 5:
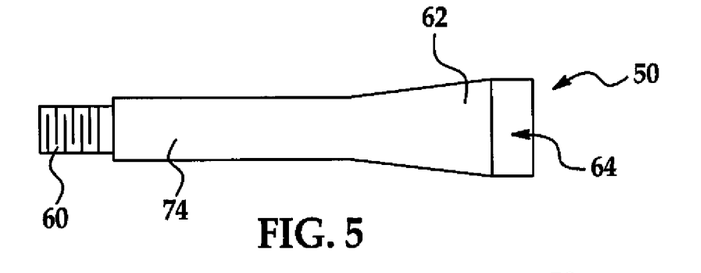
FIG. 5 is a bottom view of the nozzle shown in FIG. 4.
Figure 6:
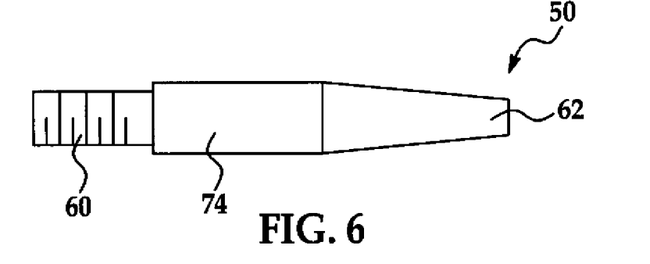
FIG. 6 is a top view of the nozzle shown in FIGS. 4 and 5.

Additional details of the nozzle 50 are illustrated in FIGS. 4-6. The nozzle 50 may include an elongate, cylindrical body 74 having a threaded end 60 adapted to be received by the threaded outlet 58, thereby allowing the nozzle 50 to be removably mounted on the dispensing gun 30. The opposite end 62 of the nozzle 50 includes an outlet 64 from which the adhesive material 45 is extruded. The cross sectional shape of the outlet 64 determines the cross sectional shape of the extruded filler 32.

Figure 7:
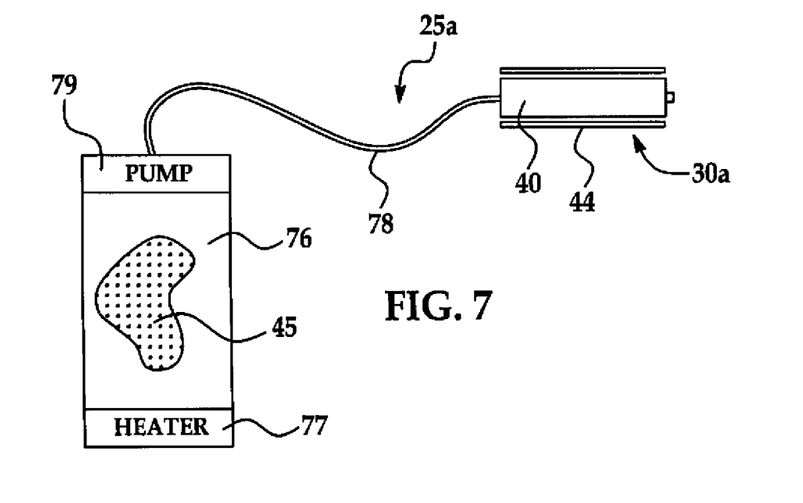
FIG. 7 is a diagrammatic view of an alternate embodiment of the apparatus.

FIG. 7 illustrates an alternate embodiment 25a of the apparatus in which adhesive material 45 is supplied to a dispensing gun 30a from a bulk supply 76 through a thermally insulated supply line 78. The bulk supply 76 may include a heater 77 for maintaining the viscosity of the adhesive material 45 at a desired level, and a metering pump 79 which pumps the adhesive filler to the dispensing gun 30a. The rate of extrusion of the adhesive material 45 from the dispensing gun 30a is determined by the metering pump 79, and may also be determined, at least in part by the temperature to which the adhesive material 45 is heated. The modified form of the dispensing gun 30a may also include a heating blanket (not shown) which regulates the viscosity of the adhesive material 45 immediately before it is extruded.

Figure 8:
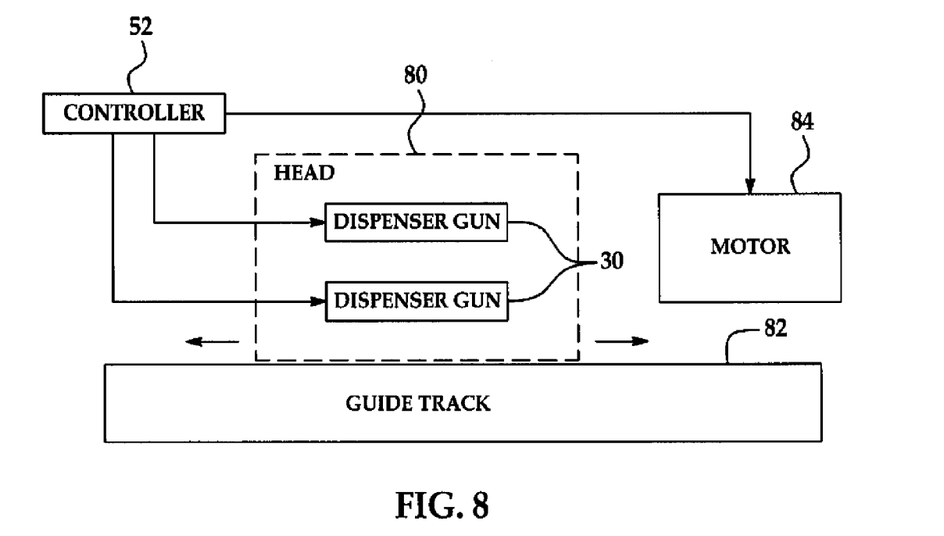
FIG. 8 is a block diagram of a further embodiment of the apparatus.
Figure 9:
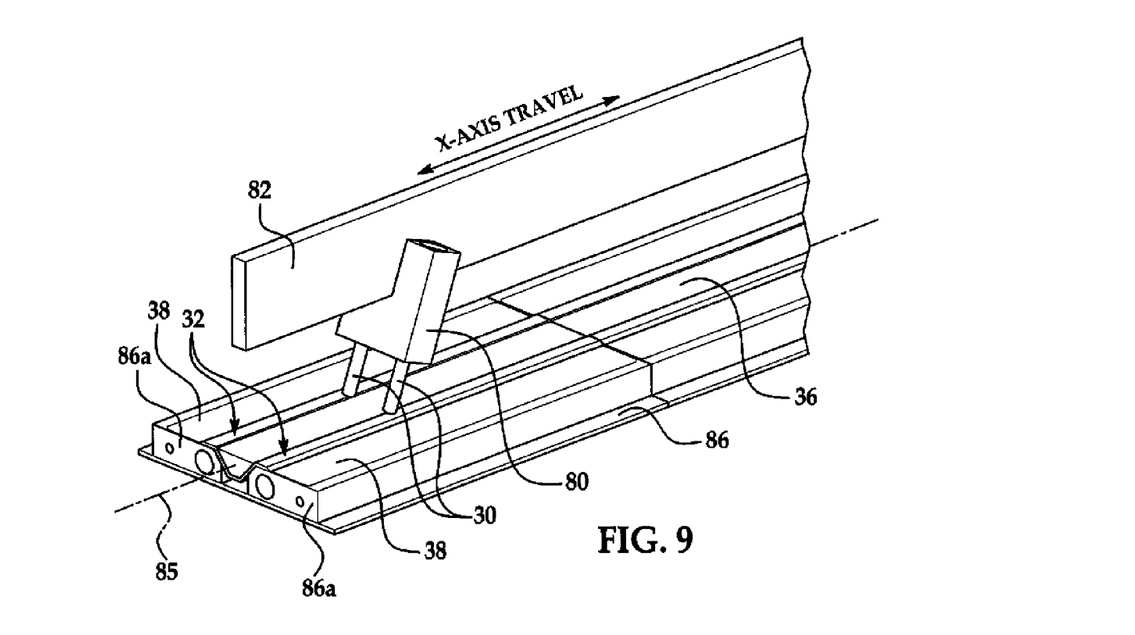
FIG. 9 is a perspective view of the apparatus shown in FIG. 8.

Attention is now directed to FIGS. 8 and 9 which illustrate equipment that may be used in a method of extruding adhesive fillers 32 directly onto a structural member, such as the stringer 36. The stringer 36 is held in a stringer assembly support tray 86 that may be used to form the stringer 36 to a desired shape. The support tray 86 may include tools 86a that are configured to form and support the stringer 36, with the flanges 38 facing up. A head 80 is mounted for linear movement on a guide track 82 which is substantially aligned with the longitudinal axis 85 of the stringer 36. A pair of dispensing guns 30 such as those previously described, are mounted in laterally spaced apart relationship on the head 80, with the respective nozzles 30 thereof aligned with the stringer 36 such that two adhesive filler lines or strips 32 are extruded directly onto those surfaces of the stringer 36 that border the gap 32 (FIG. 2) that is to be filled. Linear movement of the head 80 is driven by a motor 84 which is operated by the controller 52. The controller 52 also controls the rate at which adhesive filler material 45 is extruded from the dispenser guns 30.

In the embodiment illustrated in FIGS. 8 and 9, the adhesive fillers 32 are extruded directly onto the stringer 36, thus eliminating the need for forming the fillers 32 in a separate operation as well as the need for storing the fillers 32 until they are ready for installation, and the need to install the filler 32.

Figures 10, 11, 12, 13:
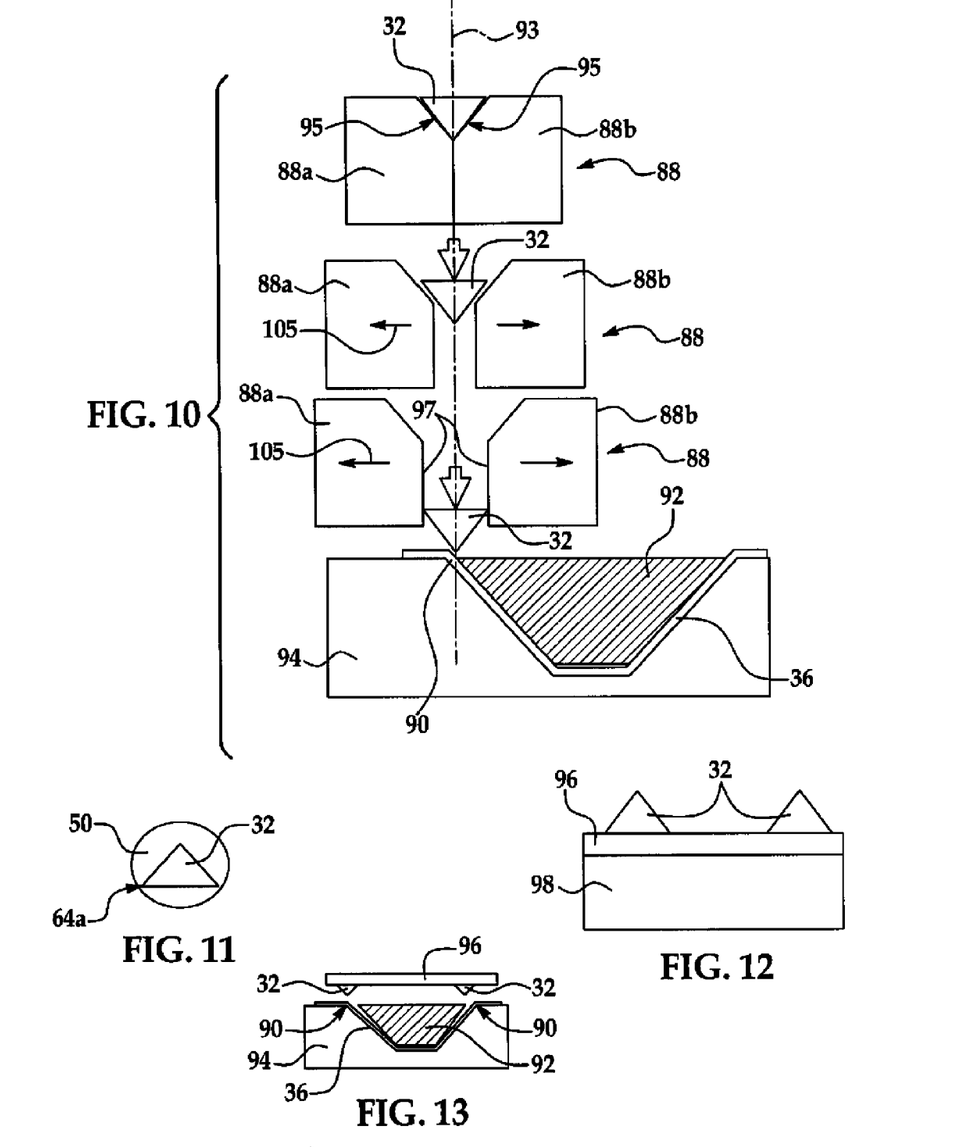
FIG. 10 is an end view of a tool set, showing successive steps used in placing an adhesive filler on the stringer shown in FIG. 2.
FIG. 11 is a cross sectional view of a dispenser nozzle used to extrude an adhesive filler having a triangular shape.
FIG. 12 is an end view of a tool set used to chill and place adhesive fillers on the stringer.
FIG. 13 is an end view of a tool for curing a stringer, and showing a carrier tool having been inverted in preparation for placing adhesive fillers on the stringer.

Attention is now directed to FIGS. 10 and 11 which illustrate a tool 88 that may be used to align and place adhesive fillers 32 on a stringer 36. The tool 88 includes first and second portions 88a, 88b having opposed beveled surfaces 95 for receiving a length of the filler 32 which in this embodiment, has a substantially triangular cross section produced by a triangularly shaped nozzle opening 64a in the nozzle 50 shown in FIG. 11.

In use, adhesive filler 32 is extruded directly onto the tool 88 using the dispensing gun 30 previously described (see FIG. 3) such that the filler 32 is supported by the bevel surfaces 95. After the adhesive filler 32 is extruded onto the tool 88, the tool 88 is transported to the location of a stringer 36 which may be supported in tools 92, 94 that are used to form, consolidate, and/or cure the stringer 36. It should be noted here that while the stringer 36 is represented by a solid line in FIG. 10 for convenience, the stringer 36 comprises multiple individual plies (not shown) at this point in the process. The tool 88 is positioned along an axis 93 that is vertically aligned above an area 90 on the stringer 36 where the filler 32 is to be placed. As shown by the arrows 105, the tool portions 88a, 88b are displaced laterally away from each other until the adhesive filler 32 clears the bevel surfaces 95 and slides downwardly onto the area 90 of the stringer 36, guided by sidewalls 97 on the tool portions 88a, 88b.

The beveled surfaces 95 assist in maintaining the triangular shape of the extruded adhesive filler 32 until the filler 32 is ready to be placed on the stringer 36. However, to further aid in maintaining the shape of the adhesive filler 32, the tool 88 may be chilled.

Attention is now directed to FIGS. 12 and 13 which illustrate an alternate method for placing the adhesive fillers 32 on a stringer 36. A pair of adhesive fillers 32 are extruded directly onto the surface of a carrier plate 96, using the previously discussed dispensing gun 30 (FIG. 3). The carrier plate 96 may be supported on a chilled block 98 which chills the carrier plate 96, and thus chills the extruded adhesive fillers 32 in order to maintain the cross sectional shape of the fillers 32. In the illustrated embodiment, the fillers 32 are shown as having a triangular cross section corresponding to the triangular extrusion outlet 64a of the nozzle 50 shown in FIG. 11.

With the adhesive fillers 32 lightly adhered to the carrier plate 96, the carrier plate 96 is transported to the location of the stringer 36 which in this example is shown as being supported in the tools 92, 94. The carrier plate 32 is then inverted, and vertically aligned above the area 90 where the fillers 32 are to be placed. The carrier plate 96 is then moved downwardly until the fillers 32 contact and adhere to the stringer 36, following which the carrier plate 96 may be returned to the block 98 in preparation for the next installation sequence.

Figure 14:
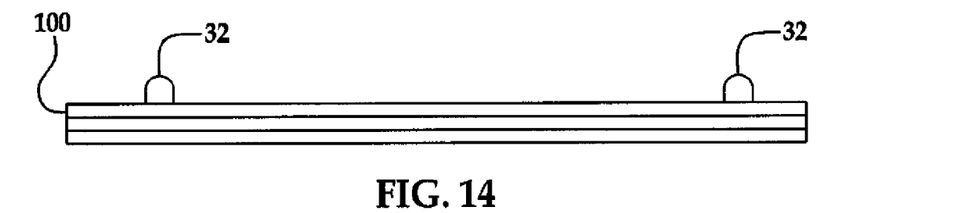
FIG. 14 is an end view of a flat composite charge having a pair of adhesive fillers extruded thereon.
Figure 15:
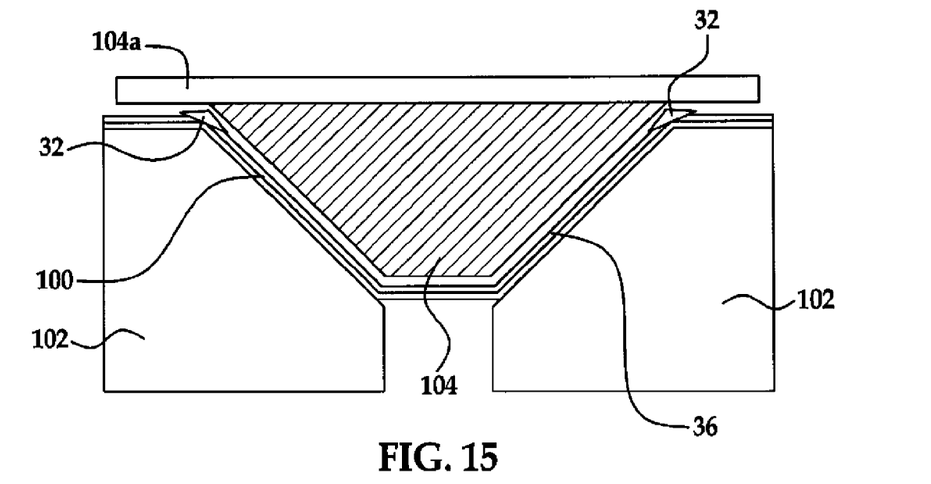
FIG. 15 is an end view of a forming tool used to form the charge of FIG. 14 into a stringer.

Referring now to FIGS. 14 and 15, it may also possible to use the dispensing gun 30 (FIG. 3) to extrude adhesive fillers 32 directly onto a flat composite charge 100. The flat charge 100 with the fillers 32 extruded thereon is then placed in a tool set 102 following which a male tool 104 mounted on a tool plate 104a is used to form the flat charge 100 into a desired shape, which in the illustrated example is a hat-shaped stringer 36. Substantially simultaneous with the forming of the flat charge 100, the combination of the male tool 104 and plate 104a form the stiff adhesive filler 32 into a shape which fills the gap 34 (FIG. 2) along the bond line 35 when the stringer 36 has been assembled onto the skin 40.

Figure 16:
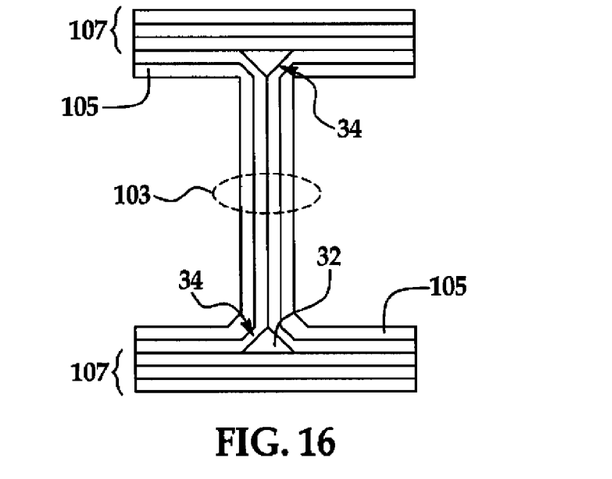
FIG. 16 is a composite structure with an "I"-shaped cross section having adhesive fillers.

FIG. 16 illustrates another typical composite structure 101 having an "I"-shaped cross section, which may comprise for example, and without limitation, a beam. The composite structure 101 comprises a web 103 having outwardly turned flanges 105, and caps 107 on the ends of the web 103. The intersection of the web 103 and the caps 107 form voids 32 that can be filled with the adhesive fillers 32 previously described.

Figure 17:
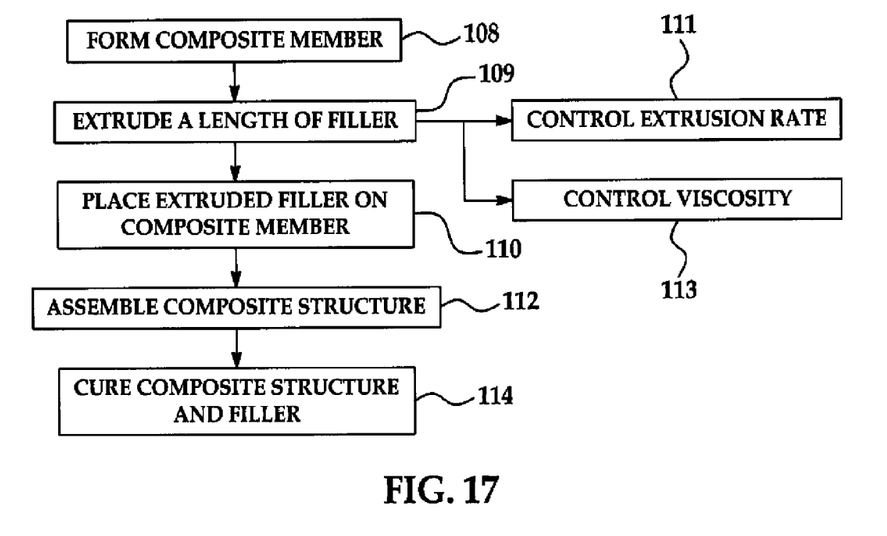
FIG. 17 is a flow diagram illustrating a method for extruding and placing adhesive fillers on a composite member.

FIG. 17 illustrates the broad steps of a method for extruding a length of adhesive filler 32 onto a composite member such as the stringer 36. Beginning at 108, the composite member is formed, typically by forming a composite ply over a set of tools (not shown). At 109, a length of an adhesive filler 32 extruded using the dispensing gun 30 previously described. As the filler material is being extruded, the extrusion rate is controlled at 111, and the viscosity of the extruded filler material is controlled at 113. At step 110, the extruded filler 32 is placed on the composite member at a location where a gap or void 34 is to be filled between the composite member and another structure (not shown). In some embodiments, as previously explained in connection with FIGS. 8 and 9, the filler 32 may be extruded directly onto the composite member. At 112, a composite structure is assembled, in which the composite member having the extruded filler applied thereto is mated or otherwise assembled with at least one other composite member. Finally, at 114, the composite structure and filler 32 are cured.

Figure 18:
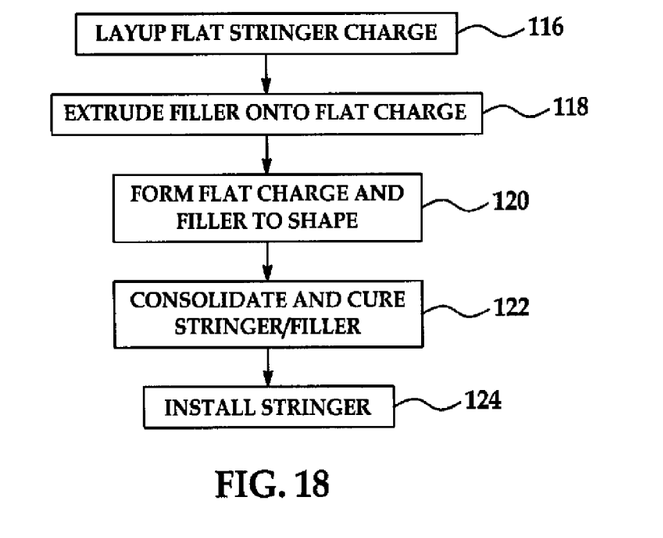
FIG. 18 is a flow diagram illustrating a method for fabricating a stringer in which an adhesive filler is extruded onto a flat charge used to form the stringer.

FIG. 18 illustrates the steps of an alternate method using the apparatus 25 (FIGS. 1 and 3), generally corresponding the method previously described in connection with FIGS. 14 and 15. At 116, a flat composite charge 100 (FIG. 14) is laid up, which may comprise a stringer charge. Then at 118, one or more fillers 32 are extruded directly onto the flat charge 100. At 120, the flat charge 100 along with the filler 32 are formed to shape. At 122, the formed stringer 36 along with the filler 32 are consolidated and cured. Finally, at 124, the stringer 36 is installed on a second composite member, such as the fuselage skin (FIG. 2) 40 previously described.

Figure 19:
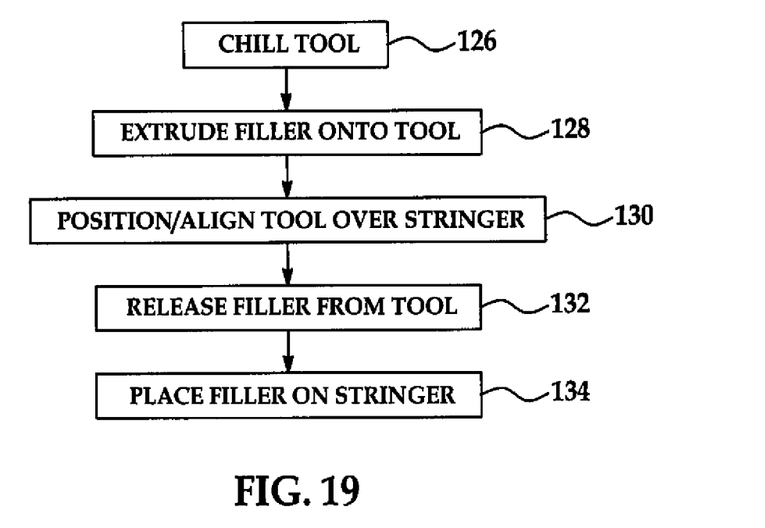
FIG. 19 is a flow diagram illustrating a method for forming the cross section of an extruded adhesive filler and for placing the filler on a stringer.

FIG. 19 illustrates still another method embodiment in which an adhesive filler 32 is extruded onto a substrate such as the tool 88 shown in FIG. 10. Beginning at step 126, the tool 88 may optionally be chilled to assist in maintaining the cross sectional shape of the filler 32. Then, at 128 the filler 32 may be extruded onto the tool 88. Next at 130, the tool is positioned and aligned over the stringer 36, following which, at 132, the filler 32 is released from the tool 88 and finally, with the filler 32 released from the tool 88, the filler is placed on the stringer as shown at step 134.

Figure 20:
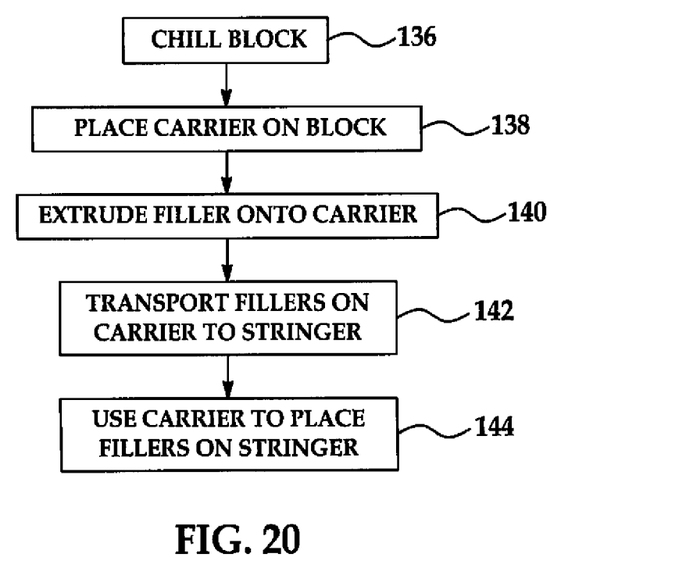
FIG. 20 is a flow diagram illustrating the use of a carrier for placing extruded fillers on a stringer.

A further method embodiment is shown in FIG. 20 generally corresponding to the process previously described in connection with FIGS. 11-13. Beginning at 136, a block 98 is chilled following which at 138, a carrier plate 96 is placed on the chilled block 98. Next, at step 140, one or more lengths of a filler 32 are extruded directly onto the carrier plate 96 which is supported on the chilled block 98. At 142 the carrier plate 96 is used to transport the extruded fillers 32 to the location of a stringer 36 or other composite member. Finally at 144, the carrier plate 96 is used to place the fillers 32 on the stringer 36.

Figure 21:
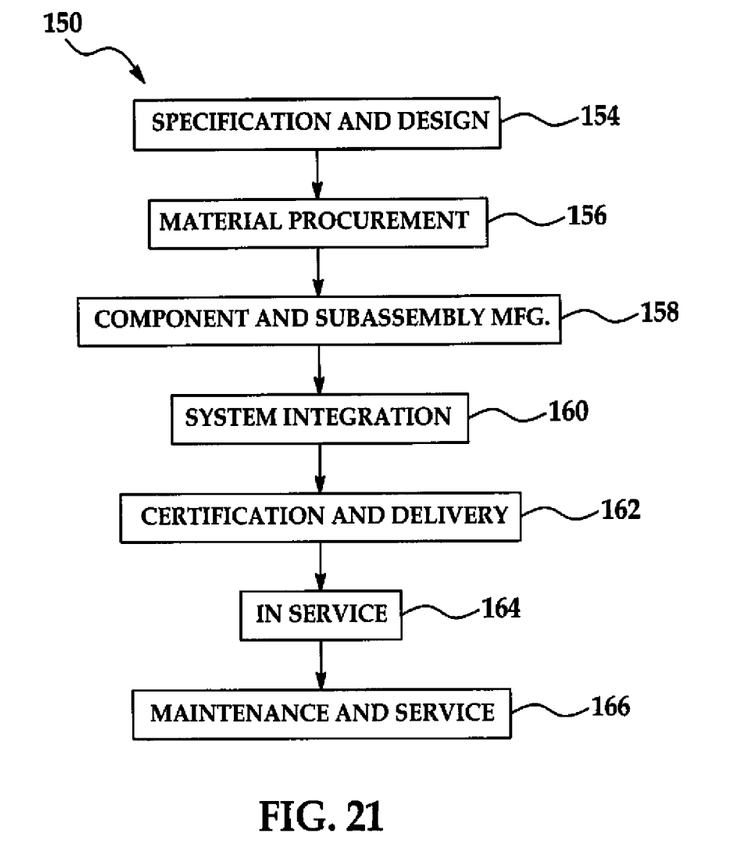
FIG. 21 is a flow diagram of aircraft production and service methodology.
Figure 22:
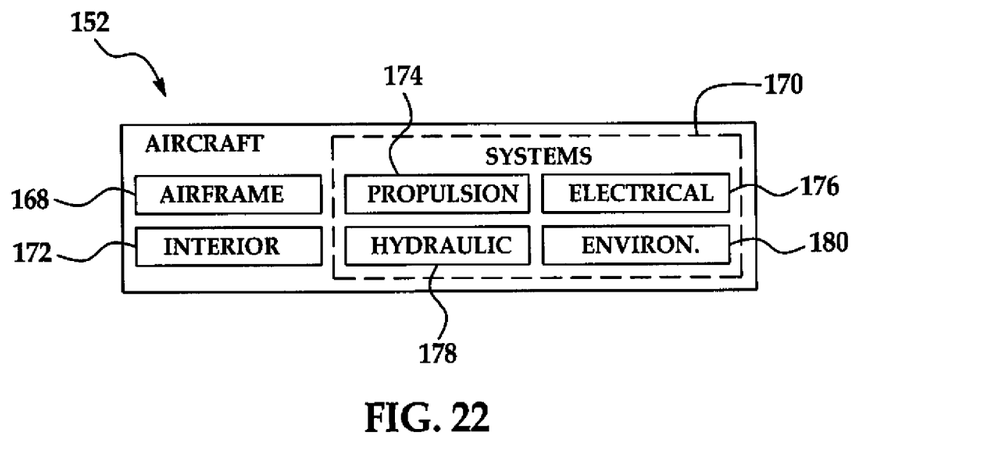
FIG. 22 is a block diagram of an aircraft.

Referring next to FIGS. 21 and 22, embodiments of the disclosure may be used in the context of an aircraft manufacturing and service method 150 as shown in FIG. 21 and an aircraft 152 as shown in FIG. 22. During pre-production, exemplary method 150 may include specification and design 154 of the aircraft 152 and material procurement 156. During production, component and subassembly manufacturing 158 and system integration 160 of the aircraft 150 takes place. Thereafter, the aircraft 152 may go through certification and delivery 162 in order to be placed in service 164. While in service by a customer, the aircraft 152 may be scheduled for routine maintenance and service 166 (which may also include modification, reconfiguration, refurbishment, and so on).

Each of the processes of method 152 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 152 produced by exemplary method 150 may include an airframe 168 with a plurality of systems 170 and an interior 172. Examples of high-level systems 170 include one or more of a propulsion system 174, an electrical system 176, a hydraulic system 178, and an environmental system 180. Any number of other systems may be included. Although an aerospace example is shown, the principles of the invention may be applied to other industries, such as the automotive industry.

The apparatus embodied herein may be employed during any one or more of the stages of the production and service method 150. For example, components or subassemblies corresponding to production process 158 may be fabricated or manufactured in a manner similar to components or subassemblies produced while the aircraft 152 is in service. Also, one or more apparatus embodiments may be utilized during the production stages 158 and 160, for example, by substantially expediting assembly of or reducing the cost of an aircraft 152. Similarly, one or more apparatus embodiments may be utilized while the aircraft 152 is in service, for example and without limitation, to maintenance and service 166.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method comprising:
   extruding an uncured flowable filler material onto a composite charge that is substantially flat, the uncured flowable filler material comprises a stiffness sufficient to maintain a pre-determined cross section after extruding and prior to shaping or curing;
   forming the composite charge into a first composite member; and
   assembling the first composite member and a second composite member.

\* \* \* \* \*